US005698025A

United States Patent [19]
Boaz

[11] Patent Number: 5,698,025
[45] Date of Patent: *Dec. 16, 1997

[54] WATER-BASED PAINT INCLUDING GLASS PARTICULATE- II

[75] Inventor: Premakaran Tucker Boaz, Livonia, Mich.

[73] Assignee: Ford Motor Company, Dearborn, Mich.

[*] Notice: The term of this patent shall not extend beyond the expiration date of Pat. No. 5,518,535.

[21] Appl. No.: 771,628

[22] Filed: Dec. 20, 1996

[51] Int. Cl.$^6$ .................................................. B28B 7/36
[52] U.S. Cl. ................... 106/600; 106/38.3; 106/635; 106/636; 106/425; 106/431; 106/38.9; 428/357; 428/426; 428/428; 428/432
[58] Field of Search ........................ 106/38.3, 600, 106/635, 425, 431, 38.9, 636; 428/357, 426, 428, 432

[56] References Cited

U.S. PATENT DOCUMENTS

| | | |
|---|---|---|
| 4,288,252 | 9/1981 | Neely . |
| 4,318,743 | 3/1982 | Blasko et al. . |
| 5,510,188 | 4/1996 | Vockler . |
| 5,518,535 | 5/1996 | Boaz . |

FOREIGN PATENT DOCUMENTS

| | | |
|---|---|---|
| 0 007 060 | 1/1980 | European Pat. Off. . |
| WO 91/14662 | 10/1991 | WIPO . |

*Primary Examiner*—Michael Marcheschi
*Attorney, Agent, or Firm*—Lorraine S. Melotik

[57] ABSTRACT

The invention is directed to glass sheets carrying a coating of a water-based paint composition comprising sodium silicate, water, water-soluble base, metal oxide pigment, soda-lime-silica glass particles and, at least one of a low-melting glass frit or zinc oxide. Preferably, it comprises only the glass frit and it further desirably comprises surfactants and aluminum hydroxide.

8 Claims, No Drawings

WATER-BASED PAINT INCLUDING GLASS PARTICULATE- II

Reference is made to related U.S. Pat. No. 5,518,535 and U.S. patent application Ser. No. 08/610,450 filed Mar. 4, 1996, U.S. Pat. No. 5,677,064, entitled "Water-Based Paint for Glass Sheets II" both to Boaz, which are commonly assigned with this invention. Reference is also made to related U.S. patent applications Ser. Nos. 08/771,626 and 08/771,629, commonly assigned with this invention and filed on Dec. 20, 1996.

FIELD OF THE INVENTION

This invention is directed to a sodium-silicate water-based paint composition especially useful for providing a paint field on soda-lime-silica glass sheets which are later subjected to high temperature tempering.

BACKGROUND OF THE INVENTION

Various paint compositions are known to skilled artisans for painting automotive and architectural glass. Such paints are used, for example, to form opaque borders around the peripheral marginal surfaces of glazings used as windshields, sidelites, and backlites of motor vehicles.

Generally these compositions are ceramic compositions formed from a mixture of metal oxides in an organic vehicle. The mixture of metal oxides is adjusted so as to achieve a specific color for the ultimately produced fired ceramic paint. For example, the opaque peripheral marginal paint bands fired onto automotive glazings are generally black and may include oxides like chrome oxide, cobalt oxide and nickel oxide. The organic vehicles generally included in such compositions, e.g., pine oil, mineral oils, low molecular weight petroleum fractions and the like are used to allow the ceramic paint to be applied to the glass surface by brushing, spreading, or screen printing. The metal oxides are non-reactive with one another, as well as non-reactive with other materials like glass frits often contained in the ceramic paint. These glass frits are the materials which ultimately fuse the ceramic paint together, and to the glass sheet, to insure that the ceramic paint remains affixed to the glass sheet after being cooled to room temperature. When these materials are applied to a glass sheet, they are heated at high temperatures generally above the softening point of the glass to cure the paint and make the painted glass sheets suitable for further handling during a latter high temperature shaping process.

In view of environmental and commercial considerations, it would be desirable if water-based paints could be developed for use in place of such organic vehicle paints. It would be further desirable to develop a water-based paint which could be cured at relatively low temperatures rather than the high temperatures generally required for ceramic/organic vehicle paint curing. Subjecting the glass having the paint coating to such high temperatures during curing of the paint often impart undesirable optical distortions into the glass sheets. In order to be suitable as a replacement for the conventionally used ceramic paints, the water-based paint would need to provide a uniform coating, be durable, and also adhere well to the glass. One such water-based paint is disclosed in U.S. Pat. No. 5,518,535 entitled "Water-Based Paint For Glass Sheets" having the same inventorship as the present invention and being commonly assigned therewith.

It is an object of the present composition to provide a water-based paint composition which displays excellent adhesion to glass. It is a further object of this invention to provide a water-based paint which is curable at relatively low temperatures and which exhibits excellent durability. It is yet a further advantage of this invention to provide a water-based paint suitable for use on glass which may be exposed to a wide range of high temperatures (often 1250° F. or more) generated during the tempering of the glass. Advantageously, the present invention water-based paint composition achieves these objectives.

DISCLOSURE OF THE INVENTION

The invention disclosed herein has several aspects. It is a water-based paint composition particularly useful as a coating on tempered soda-lime-silica glass. The composition comprises:

(i) water-soluble sodium silicate forming 20 to 45 weight percent of the composition, (ii) water forming 5 to 25 weight percent of the composition;

(iii) water-soluble base in an amount sufficient to provide the composition with a pH of at least about 10.5;

(iv) finely divided metal oxide powder being selected from the group consisting of oxides of copper, iron, nickel, cobalt and mixtures thereof forming 20 to 45 weight percent of the composition and having a particle size less than 7 microns;

(v) particles of glass forming 10 to 55 weight percent of the composition and having a diameter, on average, in the range of 5 to 20 microns and comprising soda-lime-silica glass having a melting point of at least about 1700° F.; and at least one material selected from the group consisting of:

(vi) glass frit powder melting below 1300° F. and forming 0 to 10 weight percent of the composition and having a particle size, on average, less than 10 microns; and (vi) zinc oxide forming 0 to 10 weight percent of said composition.

In addition, preferably the composition comprises small amounts of aluminum hydroxide. The invention, in another aspect, is a process of making the disclosed water-based paint which comprises combining and mixing the components in two steps. According to yet another aspect of the present invention, it comprises a glass sheet having at least a portion coated with a cured paint made from the above disclosed composition. According to still another aspect of the invention, it comprises a method for providing a cured coating of the paint on a glass sheet.

DETAILED DESCRIPTION OF PREFERRED EMBODIMENTS

The invention composition is a chromium-free water-based paint useful as a coating on glass, such as for the "black out" area around the periphery of a windshield. This composition comprises, as disclosed above, water-soluble sodium silicate, water, water-soluble base, finely divided metal oxide powder which gives the paint its black to gray color, and particles of soda-lime-silica glass. I unexpectedly found that by including these glass particles, either as a powder or spheres, the paint displayed improved stability over a wider range of high glass firing temperatures. This was important if the glass sheet carrying the paint field was to be subjected to tempering. Tempering temperatures can exceed 1250° F. In addition, the paint preferably includes a low melting glass frit to improve adhesion to the glass, to PVB which may be used in a windshield laminate, and urethane which is often used to seal and attach the glass in an automotive vehicle. It may further or alternately, include zinc oxide to enhance the adhesion of the paint to glass. Each of these components, including optional components, will be discussed in detail below.

Water-soluble sodium silicates form between about 20 and 45 weight percent of the composition of this invention, more preferably, between about 30 and 38 weight percent of the composition, i.e., as used herein "weight percent of the composition" meaning a fraction of the total weight of the composition. They may comprise a single sodium silicate or a mixture of silicates. Water-soluble sodium silicates useful in this invention composition can be represented by the formula $SiO_2:Na_2O$, wherein the mole ratio therein of the two oxides is from about 2:1 to about 4:1. In addition to the water-soluble sodium silicate, water-soluble potassium silicates of similar formula may also be included in the composition. When they are included, they are generally present in minor amounts, preferably less than 10 percent by weight, generally between about 5 and 10 weight percent of the composition.

Yet another required component of the composition is water which is included in an amount between about 5 and 25 weight percent of the total composition weight, preferably in an amount between about 10 and 25 weight percent. The composition also includes a water-soluble base which is employed to provide the paint composition with a pH of at least about 10.5, preferably being above 12.5, more preferably about 13.5. The pH is required to be on the basic side as is indicated by the required pH. Providing the composition with this pH is necessary to impart desirable shelf life to the paint. Embodiments of invention paints with a pH above about 13, for example, have been found to be shelf stable for at least 3 months. Examples of water-soluble bases which may be employed include but are not limited to sodium hydroxide and potassium hydroxide, with sodium hydroxide being preferred. The amount of base employed is dependent, e.g., on the particular base and concentration employed. For example, using a 2N sodium hydroxide base, is generally included in about 2 to 10 weight percent of the composition, more preferably in about 3 to 8 weight percent, and most optimally, in about 3 to 6 weight percent. Optimal amounts and types of bases which may be employed would be apparent to those skilled in the art in view of the present disclosure.

The composition further comprises finely divided metal oxide pigment selected from copper oxide, iron oxide, nickel oxide, cobalt oxide and mixtures thereof, with the inclusion of copper oxide being preferred. This pigment gives the paint a black color and forms 20 to 45 weight percent of the composition, preferably between about 30 to 40 weight percent of the composition. The finely divided powder pigment has a particle size (diameter) on average less than about 7 microns, preferably being between about 3 and 7 microns, most preferably being about 5 microns. These compositions would vary in color from black to dark gray, depending on the mixture and percentages of the metal oxides. Copper oxide, which is preferred, provides a black paint composition. I have found that it is undesirable to use chromium oxide in the paint composition since it interferes with the adhesion of the paint to the glass, hence my invention paint is chromium-free.

The ability of the paint composition to maintain its excellent physical properties at the very high temperatures experienced during tempering of the glass is significantly enhanced by the including particles of soda-lime-silica glass in the paint composition. This improved temperature stability is experienced even though the glass particles do not melt at the paint firing temperatures. I believe that the inclusion of the glass particles may tend to mitigate the shear stress experienced between the glass substrate and the paint ordinarily experienced during heating and cooling because of differences in their thermal expansion. In effect, inclusion of the glass particles tends to bring closer together the thermal expansion coefficients of the paint and the glass substrate. And inclusion of the glass particles, which are insoluble in the paint, has no shown any detrimental effect on the durability or other physical properties of the paint such as scratch resistance. As a matter of fact, I believe that this enhanced high temperature paint stability results in part from the glass particles providing additional structure to the paint layer which does not melt at the paint firing temperatures. While this theory has been put forth in an attempt to explain the significant improvement in the cured paint's high temperature stability properties provided by incorporation of soda-lime-silica glass particles, neither its accuracy nor understanding is necessary for the practice of the invention.

The particles are made of any soda-lime-silica glass, this type of glass being well known in the glass industry. Soda-lime-silica glass, used in the automotive and architectural industries, is commonly made by the float glass process. It is generally characterized by the following basic composition, the amounts of the components being based on a weight percentage of the total glass composition: silicon dioxide 68–75; aluminum oxide 0–5; calcium oxide 5–15; magnesium oxide 0–10; sodium oxide 10–18; and potassium oxide 0–5. Additionally, the calcium oxide+magnesium oxide is 6–15%, and sodium oxide+potassium oxide is 10–20%. Such glasses can include colorants like iron oxide, cobalt oxide, or. copper oxide to name a few. Often UV absorbers like titanium oxide or cerium oxide are incorporated to improve the optical properties. Soda-lime-silica glasses, either with or without such colorants or other additives may be used in the present invention paint composition. Desirably, the glass particles included in the paint composition would be similar or identical to the glass on which the paint will be applied, however, such is not necessary. The use of a particular soda-lime-silica glass is not critical to the improvement experienced by the present invention. The glass particles may be in powder or spherical form. Generally, the diameter of the particles is, on average, less than 20 microns, being preferably 3 to 15 microns. More preferably, the particles have a diameter in the range of about 5 to 7 microns.

The soda-lime-silica particles are included in the paint composition in an amount from 10 to 55 weight percent based on total weight of the paint composition. Preferably, the amount of high-melting glass particles in the water-based paint is from 10 to 45 wt. percent, optimally being 20 to 40. These particles may be obtained by grinding the glass to a desired diameter or obtained commercially. Spherical particles are most desirable when the paint is to be applied by screen printing, since they are less abrasive to the screen. Spherical particles are commercially available, for example, from Cataphote Inc., under the name GLASS-SHOT™ glass particles. In the case of spherical particles the size may be 5 to 20 microns or even smaller since they optimally suitable for use, however smaller sizes are not as readily commercially available.

In addition to the above required components, the chromium-free paint further includes at least one adhesion promoter selected from the group consisting of: a low melting glass frit powder and zinc oxide. At least one of these materials needs to be included in the paint composition. It is most desirable, however, that only the low-melting glass frit be included in the composition. However, the zinc oxide may be included along with the low-melting glass frit or in place of it. These adhesion promoters have been found to promote the adhesion of the paint to the glass. And, in addition, when the paint is used in contact with vinyl as in a laminated windshield, these adhesion promoters also promote the adhesion of the vinyl to the glass as described below.

The paint desirably, but optionally, includes a minor amount of a glass frit powder. This glass frit is a glass material which melts below about 1300° F. Optimally it is included in the water based paint composition in an amount comprising up to about 10 weight percent, more preferably being between about 2 and 10 weight percent, most preferably being between about 2 and 8 weight percent of the present invention blackish paint composition. Most preferably, the low-melting glass frit is present in the composition in an amount of about 5 weight percent, based on the total composition weight. The glass frit, when used, is incorporated into the paint composition in a powder form, the particle diameter being on average less than about 10 microns, preferably being between about 3 and 7 microns, most preferably being on average about 7 microns. Exemplary of preferred glass frit materials useful in the present composition, often referred to as enamel frits, are silicates of metals such as zinc, boron, bismuth, titanium, zirconium, and aluminum and mixtures thereof, e.g., titanium-silicate glass, zinc boro-silicate glass and bismuth boro-silicate glass. Many such glass frits are readily commercially available as from General Colors Co. and O. Hommell Co. Still other glass frits which may be employed in the present invention will be apparent to those skilled in the art in view of the present disclosure. I have found that including this low-melting frit powder in the glass composition significantly improves the adhesion of the paint to the glass, to PVB or urethane sealants when used in contact with the paint. As is known, PVB is used within laminated windshields and urethane sealants are used between the glass and the car body. While the glass frit is not generally soluble in water, unexpectedly I have found that the glass frit appears to be at least partially soluble in my water-based paint composition. I believe that this may be due to the use of a high level of base (e.g., NaOH) in my composition. The ability of the glass frit to be soluble along with other water-soluble components of the paint composition, e.g., sodium-silicates, may allow the glass frit to interact with other water-soluble components of the paint composition so as to improve the adhesion of the cured paint.

Another optional component which may be included in the paint is zinc oxide as another adhesion promoter. When included in the composition, it comprises generally about up to 10 weight percent, preferably being 2 to 10 weight percent, and more preferably between about 3 and 6 weight percent. Optimally, when included, it comprises between about 4 and 6 weight percent based on the weight of the composition. The zinc oxide is preferred to be provided in the paint composition in a particle size of between about 2 and 3 microns on average, however particle size is not critical. The inventor believes that the zinc oxide lowers the expansion coefficient of the silicate paint composition, making it more nearly match that of the glass composition so that during heating and cooling of the glass less stress develops in the paint. It likewise improves the adhesion to vinyl and urethane sealants.

Still another optional, but desirable, component included in the black paint composition of this invention is a surfactant. Surfactants are well known materials and often added to paints to improve the wetting characteristics of the liquid paint to the substrate to which it is applied. Exemplary of one such material is "FC-171" made by 3M Company. Still other surfactants are known to those skilled in the art. Desirably, it forms about 0.1 to 1.0 weight percent of the paint composition, more preferably about 0.25 to 0.5 weight percent. Another optional but desirable component is aluminum hydroxide which is preferably included in the composition in up to about 5% by weight of the composition. It is generally added to the paint as aluminum hydroxide hydrate and has been found to increase the shelf life of the paint and may increase the adhesion of the paint to the glass sheet.

While this paint composition has particular utility on soda-lime-silica glass as used in automotive and architectural glass, its use is not meant to be so limited. It may also find application for used on other glass like spandrel or on decorative glass panels.

To make the paint composition, the components are generally added together and then ball milled until a substantially uniform mixture of components is obtained. This milling may also be carried out to provide the desired particle size of the components, for example the glass particles and optional components like the glass frit, if they are initially present in particles sizes which are larger than desired in the final paint. That is, in some situations, these components may be initially added into the mixture in larger particle sizes which are then reduced into smaller particles during the milling of the components. This mixing is generally carried out at room temperature. Often, the base is added after the ball milling or in the final stages of the milling. We have found that after a time, the paint composition becomes more viscous and that is due to the addition of the particles like soda-lime-silica glass particles. Thus to increase the shelf life, we prefer to add the soda-lime-silica glass powder and the low melting frit to the mixture of the other components just before the paint is to be used. In other words, a mixture of the silicates, water, base, and colorants can be mixed together. This represents about 50 to 80 wt. percent of the final paint composition. Later the glass frit, glass powder, and zinc oxide, if used, can be mixed in to form the final paint composition.

After making the subject invention composition, it may be applied to a substrate, particularly a glass substrate, by any technique. The glass sheet may be prepared from any type of glass generally known in the art of glass making. Typical glass sheets contemplated for use according to the present invention are soda-lime-silica automotive and architectural glazings, generally produced by the well-known float glass process.

In operation, the paint is applied as a uniform layer to a surface of the glass sheet in a predetermined pattern by a conventional paint application method, e.g., screen printing wherein the paint is spread across the screen by a squeegee to force the paint through the pattern onto the glass sheet. It is well known in the painting arts to apply a band of paint to the surface of an automotive glazing by screen printing. In such a situation, it is particularly desirable to maintain a moist environment surrounding the paint during the screening process. Optimally the moist environment is maintained about 80+5% rh with the present invention preferred paint compositions. Maintaining this moist environment allows for prolonged use of the paint application screen system by maintaining the moisture content of the paint at a desirable viscosity for application. This environment may be optimally provided, e.g., by the invention described in U.S. Pat. No. 5,509,964 to Boaz and commonly assigned with this invention. It is entitled "Apparatus and Method for Applying a Coating to Glass".

The predetermined pattern in which the paint may be applied to a glass sheet may comprise, for example, an opaque concealment band positioned on a peripheral marginal surface of an automotive glazing. Such concealment bands are well known in the art of automotive glazings as useful for preventing the solar radiation induced degradation of adhesives used to mount the glazings in a vehicle opening, and for concealing attachment hardware and structural components which lie below the edges of the glazings. The band generally extends to the edges of the glazings, and has a width sufficient to conceal the underlying adhesive and structural components, but which is sufficiently narrow to provide maximum vision to occupants of the vehicle. Clearly, other predetermined patterns may be utilized where applying various paint fields to glass surfaces, depending upon the ultimate purpose for the cured paint field.

In the case of coatings applied to automotive glass as "black out", the coating is preferably provided in a thickness of about 12–16 microns. The coating may be applied in any thickness, however, the optimal thickness being determined by the particular application desired.

The curable compositions of the invention, after being applied to a substrate, are readily cured by baking at an elevated temperature for a time sufficient to drive off the water which cures the coating. This step may be carried out at any temperature, but desirably at a temperature below the softening point of the glass. Since this water vaporization and curing can be preferably carried out at moderate temperatures, e.g., below about 400° C., even between about 100° C. and 200° C., the painted glass is not subjected to softening and hence is prevented from being distorted during the moderate temperature.

This is in contrast to conventional organic vehicle paints which require being heated to temperatures above the softening point of the glass to cure these paints. Paint compositions applied to glass sheets are generally first cured in order to make the painted glass available for handling for further processing, i.e., bending of the painted glass sheet into a desired final shape. Heating glass to temperatures above the softening point of the glass to cure organic vehicle paints provides the glass with an opportunity to pick up distortions. Subsequent bending of the painted glass, in a second firing, again at these high temperatures provides a second opportunity for distortions to be incorporated into the glass product. Hence, the present invention paint, because it can cure at relatively low temperatures below the softening point of the glass, desirably minimizes the opportunity for distortion to be incorporated into the glass product.

This drying and curing of the water-based black paint composition may be carried out by any means. Two particularly preferred means comprise subjecting the paint applied to the glass to Infra Red (IR) radiation or microwave radiation as in a microwave oven. The latter is most particularly preferred because it may be provided as a compact unit of relatively small size, it consumes less energy and generally requires less maintenance.

In the case of a windshield type 12"×12" sample which had an embodiment of the invention paint composition applied to a portion of its surface as a "black out" band, it was found that the coating could be cured in about one minute at 150° C. in an IR oven or less than about 1 minute in a microwave oven (4 KW power). The particular embodiment of paint composition employed and the area coated suggest the optimal particular parameters useful to cure the invention paint.

As is evident, the present invention moderate temperature curable compositions are of considerable advantage in that they provide for significant energy savings in comparison to compositions which require significantly elevated temperatures for curing. In addition, as discussed above, when the substrate is glass, optical distortions can be incorporated into the glass sheet when it is exposed to significantly elevated temperatures as required to cure conventional organic vehicle glass coatings. The present invention composition overcomes this disadvantage of prior art coatings which require elevated temperatures for curing the paint. While, as described above, the paint finds particular usefulness on glass, it may also be used to paint other substrates, including, e.g., metal or plastic.

Generally, coated automotive glass will subsequently be subjected to shaping which involves subjecting the glass to high temperatures of the order of 1150° F. or more in a Lehr, which can be 1250° F. or more if the glass is tempered. This will allow the coating to further cure, although such is not required to provide a durable and adherent coating on a substrate. The following examples are presented by way of description of the invention and to set forth the best mode contemplated by the inventor, but are not to be construed as limiting.

EXAMPLES

The following three examples are embodiments of paint compositions made according to the present invention. All component amounts are in weight percent of the total paint composition.

| Paint # | 1 | 2 | 3 |
| --- | --- | --- | --- |
| Sodium Silicate | 25 | 28 | 23 |
| Ground Glass (Soda Lime glass 7 micron diameter) | 25 | 27 | 30 |
| Potassium Silicate | 0 | 1.0 | 1.0 |
| Water | 14.9 | 10 | 7 |
| Sodium Hydroxide (50% solution) | 2 | 3.0 | 3.9 |
| Copper Oxide | 28 | 26.0 | 30 |
| Zinc Oxide | 0 | 1.0 | 0 |
| Glass Frit (bismuth borosilicate) | 5.0 | 3.9 | 5.0 |
| Surfactant (FC-171, 3M Company) | 0.1 | 0.1 | 0.1 |

The black paint compositions above were applied by screen printing to glass (soda-lime-silica) sheets to a thickness of 16 microns and cured in an IR over for 3 minutes at 120° C.

The black cured paint displayed uniform coating and excellent adherence to the glass as was shown by subjecting the painted glass to a hot water bath for 5 days at 60° C. whereby the paint showed no delamination.

The paints were also tested for adhesion to urethane type adhesives, by the test described below, since these adhesive materials are often used in contact with glass for mounting into a vehicle.

Urethane Adhesive/Paint/Glass Adhesion Test

The surface of a glass panel is painted and the paint fully cured bypassing it through an oven which heats the glass to over 550° C. A portion (stripe) of the painted surface is prepared for urethane adhesion by first applying a coating of Essex glass primer—Prep. No. 43519. On this prepared surface, another layer of Essex glass primer No. 43520A is applied. The primer is allowed to dry for about 10 minutes at room temperature, and then a "bead" of Essex urethane polymer adhesive is applied on the primer coatings. A second glass panel is prepared in identical fashion except that the urethane adhesive is not applied. The two glass panels are then pressed into contact so that the urethane adhesive contacts the primer of the second panel, leaving about 0.25' between the painted surfaces of the panels. The pair is allowed to cure for 72 hours in air. To pass the adhesion test, the urethane and not the adhesive surface must break when the panels are twisted against each other. The reliability of adhesion is tested after the adhered pair is immersed in water at 150° F. for a chosen length of time.

The above paint compositions all showed excellent adhesion and successfully passed the urethane adhesion test.

Four other paint compositions were made as follows:

|  | Point No. | | | |
|---|---|---|---|---|
|  | #4 | #5 | #6 | #7 |
| Sodium Silicate | 32 | 30 | 28 | 25.0 |
| Soda-Lime-Silica Glass | 0 | 0 | 30 | 30.0 |
| Potassium Silicate | 3.8 | 3.8 | 0.0 | 0.0 |
| Water | 20.0 | 20.0 | 10.8 | 12.8 |
| Copper Oxide | 40.0 | 33.0 | 27.0 | 25 |
| Glass Frit (bismuth borosilicate) | 0.0 | 7.0 | 0.0 | 5.0 |
| Zinc Oxide | 0.0 | 2.0 | 0.0 | 0.0 |
| Aluminum Hydroxide | 0.0 | 0.0 | 2.0 | 0.0 |
| Sodium Hydroxide (50%) | 4.0 | 4.0 | 2.0 | 2.0 |
| Surfactant (FC-171, 3M Company) | 0.2 | 0.2 | 0.2 | 0.2 |

(The glass powder has a 7 micron average diameter)

The two paint compositions according to embodiments of the present invention (#6 and #7) and two comparative paint (#4 and #5), not according to the present invention, were tested for adhesion to urethane polymer adhesives as described above and also to polyvinyl butyral (used as an interlayer in windshields) as follows:

Vintl/Paint/Glass Adhesion "Pummel Test"

A 3" border of a paint is provided in a laminated pair of glass panels with the paint being on a surface in contact with a polyvinyl butyral interlayer. The laminate is cooled and stabilized at −10° C. for four hours. At the end of the four hours, the laminate is quickly removed and the painted portion placed over an anvil whereafter the portion is subjected to a five minute series of blows from a heavy hammer. At this temperature, the vinyl is hard and has poor adhesion to the crushed glass particles. The adhesion of the glass particles to the vinyl is rated by comparison to standards defined from #1 to #10,3, #1 indicating complete loss of adhesion between the vinyl/paint/glass and #10 indicating full adhesion of vinyl/paint/glass.

Results of Pummel Tested Vinyl/Paint/Glass

4 paint: #1–#2 Pummel Test
5 paint: #4–#6 Pummel Test
6 paint: #6–#8 Pummel Test
7 paint: #6–#8 Pummel Test

| Results of Urethane/Paint/Glass Adhesion Test, After: | | | | |
|---|---|---|---|---|
|  | 4 Hours | 24 Hours | 48 Hours | 120 Hours |
| #4 paint | failed | — | — | — |
| #5 paint | passed | passed | passed | passed |
| #6 paint | passed | passed | passed | passed |
| #7 paint | passed | passed | passed | passed |

It can be seen from the above test results, that the inclusion of a soda-lime-silica glass powder in the paint composition significantly improved the adhesion of the paint to the glass. The inclusion in the amount of glass frit in the paint composition from 2% to 7% is seen to also increase the adhesion of the cured paint composition to the glass. Increasing the amount beyond that specified in the present invention composition, however, was found to be unsuitable as the paint then tended to "gel".

I claim:

1. A glass sheet having a cured coating of a water-based paint composition on at least a portion of said sheet, said composition comprising:
   (i) water-soluble sodium silicate forming 20 to 45 weight percent of said composition,
   (ii) water forming 5 to 25 weight percent of said composition;
   (iii) water-soluble base in an amount sufficient to provide said composition with a pH of at least 10.5;
   (iv) finely divided metal oxide powder selected from the group consisting of oxides of copper, iron, nickel, cobalt and mixtures thereof forming 20 to 45 weight percent of said composition and having a particle size, on average, less than 7 microns;
   (v) particles of soda-lime-silica glass forming 10 to 55 weight percent of the composition and having a diameter, on average, less than 20 microns and having a melting point of at least about 1700° F.; and at least one material selected from the group consisting of:
   (vi) low-melting glass frit powder melting below 1300° F. forming 0 to 10 weight percent of said composition and having a particle size, on average, less than 10 microns; and
   (vii) zinc oxide forming 0 to 10 weight percent of said composition.

2. The glass sheet according to claim 1 wherein said composition comprises 10 to 45 percent by weight of said soda-lime-silica glass particles based on the total weight of the composition.

3. The glass sheet according to claim 1 wherein said composition further comprises potassium silicate.

4. The glass sheet according to claim 1 wherein said low-melting glass frit forms 2 to 10 weight percent of said composition.

5. The glass sheet according to claim 1 wherein said composition further comprises 0.1 to 1.0 weight percent of a surfactant.

6. The glass sheet according to claim 1 wherein said composition further comprises up to about 5 weight percent of aluminum hydroxide.

7. The glass sheet according to claim 1 wherein said glass frit is a metal silicate wherein said metal is selected from the group consisting of zinc, boron, bismuth, titanium, zirconium, and aluminum and mixtures thereof.

8. The glass sheet according to claim 1 wherein said glass sheet is an automotive or architectural glazing.

* * * * *